(12) United States Patent
Trisnadi et al.

(10) Patent No.: US 9,667,928 B2
(45) Date of Patent: May 30, 2017

(54) LAMBERTIAN SERVO SENSOR POSITION AND TIMING

(71) Applicant: PRYSM, Inc., San Jose, CA (US)

(72) Inventors: Jahja I. Trisnadi, Cupertino, CA (US); Alan C. Burroughs, San Jose, CA (US)

(73) Assignee: PRYSM, Inc., San Jose, CA (US)

( * ) Notice: Subject to any disclaimer, the term of this patent is extended or adjusted under 35 U.S.C. 154(b) by 130 days.

(21) Appl. No.: 14/640,485

(22) Filed: Mar. 6, 2015

(65) Prior Publication Data

US 2016/0261830 A1 Sep. 8, 2016

(51) Int. Cl.
*H04N 9/31* (2006.01)
*G09G 3/02* (2006.01)

(52) U.S. Cl.
CPC ............ *H04N 9/317* (2013.01); *G09G 3/025* (2013.01); *H04N 9/3129* (2013.01); *H04N 9/3147* (2013.01); *H04N 9/3155* (2013.01); *H04N 9/3164* (2013.01); *H04N 9/3194* (2013.01); *G09G 2300/026* (2013.01); *G09G 2320/029* (2013.01)

(58) Field of Classification Search
CPC ...... G02F 1/133526; G02B 2027/0118; G02B 26/0841; H04N 9/3129
See application file for complete search history.

(56) References Cited

U.S. PATENT DOCUMENTS

| | | | |
|---|---|---|---|
| 2006/0039059 A1* | 2/2006 | Ji ....................... | G02B 26/0841 359/202.1 |
| 2011/0181948 A1* | 7/2011 | Kindler ................. | G03B 21/56 359/454 |
| 2013/0057848 A1* | 3/2013 | Simpson .............. | G01N 21/636 356/30 |
| 2013/0100096 A1* | 4/2013 | Webster ............... | G09G 3/3466 345/207 |
| 2014/0146088 A1* | 5/2014 | Wyrwas ................... | G09G 5/10 345/690 |
| 2014/0307230 A1* | 10/2014 | Hajjar .................... | H04N 9/317 353/30 |
| 2014/0340620 A1* | 11/2014 | Zhang ............... | G02F 1/133514 349/105 |

* cited by examiner

*Primary Examiner* — Gerald Johnson
(74) *Attorney, Agent, or Firm* — Patterson & Sheridan, LLP

(57) ABSTRACT

The present disclosure generally relates to a LPD system having a plurality of detectors for detecting light reflected from the back surface of the screen. The detectors are positioned to detect light from one or more portions of the screen that are not directly in front of the detector.

25 Claims, 9 Drawing Sheets

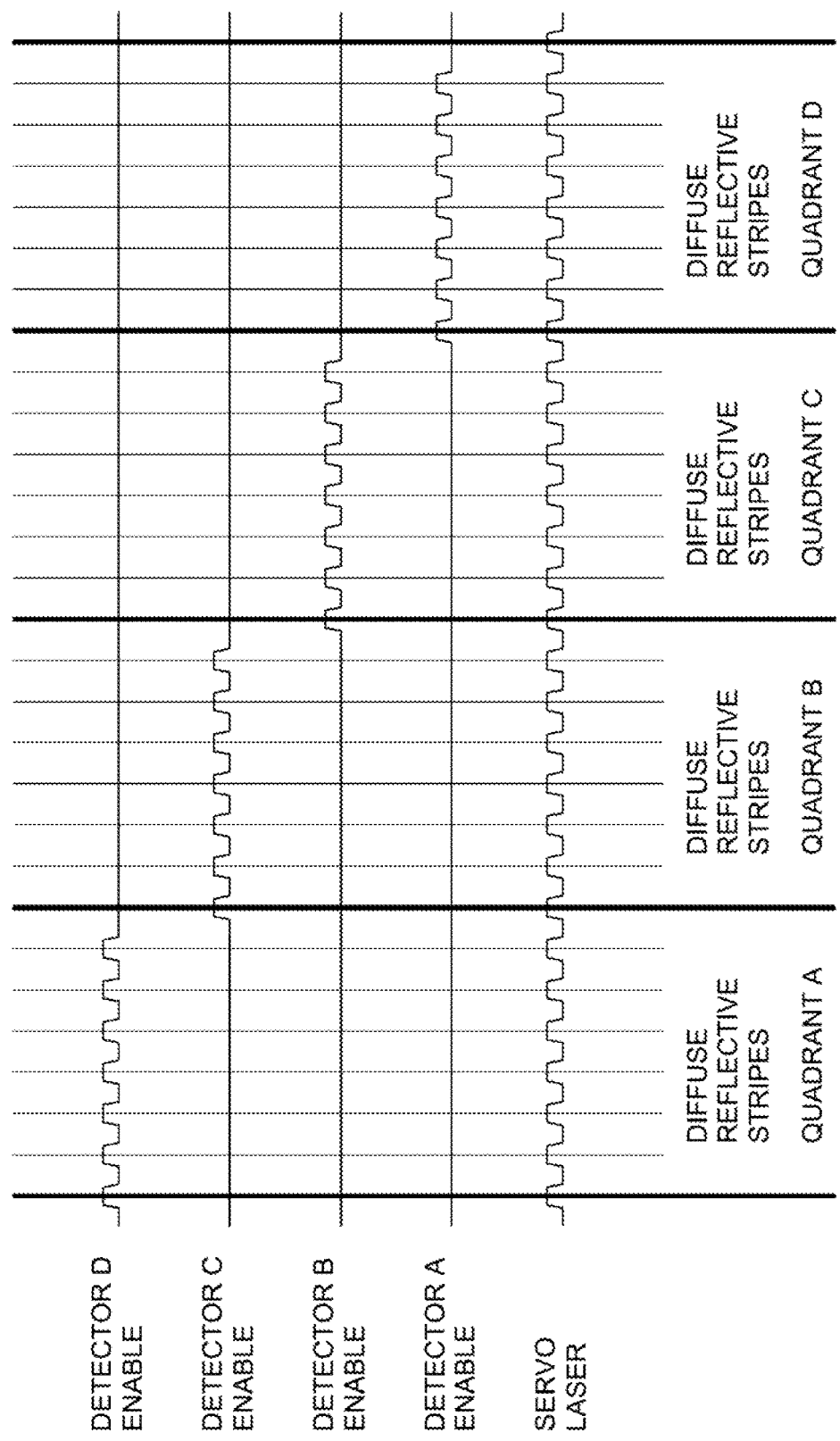

LAMBERTIAN SERVO SENSOR POSITION AND TIMING

BACKGROUND

Field

Embodiments of the present disclosure generally relate to a display screen system. More specifically, the present disclosure relates to detector positioning in a Lambertian screen system.

Description of the Related Art

Electronic display systems, including stereo display systems, are commonly used to display information from computers and other sources. Typical display systems range in size from small displays used in mobile devices to very large displays, such as tiled displays, that are used to display large size images and video. Examples of such displays include rear projection displays such as digital light processing (DLP) displays, liquid crystal on silicon (LCOS) displays, grating light valve (GLV) displays and laser-phosphor displays (LPD). Tiled display systems are generally made up of multiple smaller individual display devices, or "tiles", that are carefully aligned when assembled to provide a seamless and uniform appearance. In some implementations, each tile may be a light-based electronic display device, such an LPD, including a self-contained laser-based image-generating system.

In a LPD system, a light beam from a light source is directed onto pixels that are present within the screen. Some light is reflected from the screen, or in some cases diverted from the screen, towards a detector that provides feedback regarding the light beam. The information gathered by the detector is sent to a processor that makes adjustments to the system operation.

Some LPD systems use a raster scanning device. In such systems, space is a premium, and the location of the detector is limited and the states of the raster scanned beams at any given time must be determined. Therefore, there is a need in the art for a system including a detector for gathering information regarding a beam from a light source.

SUMMARY

The present disclosure generally relates to a LPD system having a plurality of detectors for detecting light reflected from the back surface of the screen. The detectors are positioned to detect light from one or more portions of the screen that are not directly in front of the detector.

In one embodiment, a system comprises a screen. The screen includes a plurality of pixels, each pixel having a plurality of subpixels spaced apart by a distance such that a space is present between adjacent subpixels; a filter layer, wherein the pixels and subpixels are disposed on a first side of the filter layer, and wherein the filter layer has a second side opposite the first side and wherein the second side is parallel to the first side; and a plurality of first reflective regions, wherein the plurality of first reflective regions are disposed on the second side of the filter layer opposite the first side and wherein each first reflective region is aligned with a corresponding space between at least one pair of adjacent subpixels. The system also includes one or more light sources; one or more rotatable raster scanning devices; one or more focusing lenses, wherein the one or more light sources, the one or more rotatable raster scanning devices and the one or more focusing lenses are arranged such that light emitted from the one or more light sources is directed at the one or more rotatable raster scanning devices and then reflected through the one of more focusing lenses and then onto the screen; and a plurality of detectors, wherein each of the plurality of detectors is placed within a space between the second side of the filter layer and the one or more focusing lenses, wherein each detector has a face and wherein the face of each detector is angled towards a portion of the screen, and wherein each detector's face is angled to a direction that is away from the detector's nearest point of the screen.

In another embodiment, a system comprises an enclosure, wherein the enclosure is bound by a screen and a plurality of walls. The screen includes a filter layer having a plurality of detector regions disposed thereon, the enclosure having detection area and a plurality of sub-enclosures, each sub-enclosure having an enclosure wall having an opening therethrough. The system additionally includes one or more light sources disposed within each sub-enclosure; a raster polygon disposed within each sub-enclosure; a focusing lens disposed within the opening of each sub-enclosure; and a plurality of detectors disposed between the enclosure wall and the screen, wherein the plurality of detectors face the screen, wherein at least one detector is positioned to detect scattered light from the screen that originates from one or more light sources disposed within a corresponding sub-enclosure.

In another embodiment, a system comprises an enclosure, wherein the enclosure is bound by a screen and a plurality of walls. The screen includes a filter layer having a plurality of detector regions disposed thereon, the enclosure having detection area and a plurality of sub-enclosures, each sub-enclosure having an enclosure wall having an opening therethrough. The system additionally includes one or more light sources disposed within each sub-enclosure; a raster polygon disposed within each sub-enclosure; a focusing lens disposed within the opening of each sub-enclosure; and a plurality of detectors disposed between the enclosure wall and the screen, wherein the plurality of detectors face the screen, wherein at least one detector is positioned to detect scattered light from the screen that originates from one or more light sources disposed within an adjacent sub-enclosure.

In another embodiment, a system comprises a screen, the screen having a filter layer with a plurality of detector regions thereon; a light source; a light directing system disposed between the light source and the screen and configured to direct light at the filter layer and scan the light across the filter layer; and four detectors disposed in a plane that has four hypothetical quadrants, wherein the screen has four hypothetical quadrants that are aligned with the four hypothetical quadrants of the plane, wherein the plane is parallel to the screen, wherein each detector has a face that is disposed at an angle relative to the screen, wherein a center line of each detector is perpendicular to the face of the corresponding detector, wherein the center line of each detector intersects a center of a hypothetical quadrant of the screen that is cattycorner the hypothetical quadrant of where the detector is located.

In another embodiment, a method is disclosed. The method comprises directing a light from a light source to a screen, wherein the screen is divided into four hypothetical quadrants including an upper left quadrant, an upper right quadrant, a lower left quadrant, and a lower right quadrant, and wherein the screen additionally has reflective regions and pixel regions disposed between the reflective regions; scanning the light across the screen; and detecting the light that has been diffusely reflected from the screen, wherein the detecting is performed by a plurality of detectors, wherein each hypothetical quadrant has a corresponding detector including an upper left detector, an upper right detector, a lower left detector, and a lower right detector, and wherein the detecting comprises: detecting light reflected from the upper left quadrant with the lower right detector; detecting light reflected from the upper right quadrant with the lower left detector; detecting light reflected from the lower left quadrant with the upper right detector; and detecting light reflected from the lower right quadrant with the upper left detector

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 8A and 8B are schematic illustrations of the timing of detector operations in an LPD system according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to a LPD system having a plurality of detectors for detecting light reflected from the back surface of the screen. The detectors are positioned to detect light from one or more portions of the screen that are not directly in front of the detector.

Figure 1A:
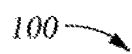
FIGS. 1A-1C are schematic illustrations of an electronic display system according to one embodiment.
Figure 1A:
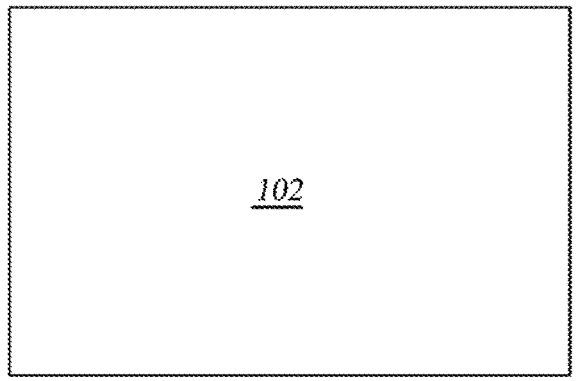
Figure 1B:
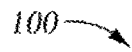
Figure 1B:
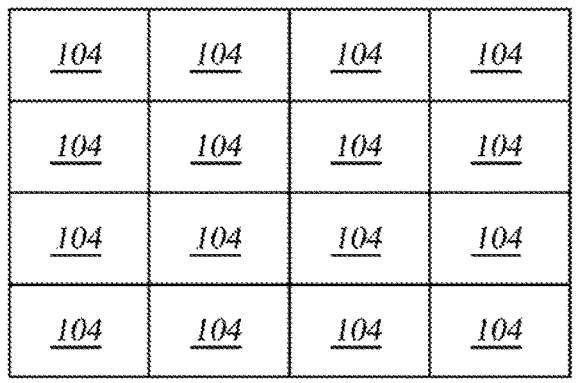
Figure 1C:
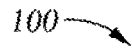
Figure 1C:
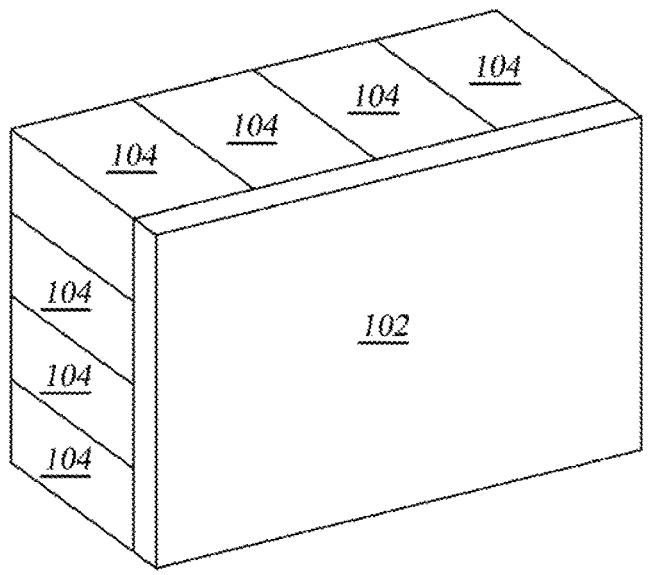

FIGS. 1A-1C are schematic illustrations of an electronic display system 100 according to one embodiment. FIG. 1A is a front view showing a screen 102. FIG. 1B is a back view showing the individual LPD light engines 104 that collectively form a seamless image on the LPD screen 102. FIG. 1C is an isometric view of the system 100. It is to be understood that while 16 LPD light engines 104 are shown, more or less LPD light engines 104 may be used. It is to be understood that while a single screen is shown for LPD screen 102, it is contemplated that each individual LPD light engine 104 may have a corresponding screen that are distinguishable from one another. Additionally, it is to be understood that the LPD screen 102 may comprise a plurality of screen pieces that are coupled together, such as to form a quilt, to give the impression of a single screen. Additionally, it is to be understood that while the LPD light engines 104 collectively project to a common LPD screen 102, each LPD light engine 104 may have a separate screen such that when the LPD light engines 104 are positioned in the desired orientation, the screen or screens of the individual LPDs collectively produce the desired image.

In the situations where the LPD screen 102 is a collection of screen pieces that are coupled together (or, where each LPD light engine 104 has a distinct screen), the "seams" between adjacent screen pieces (or adjacent screens) could potentially be visible. To minimize the visibility of the "seams" in a quilted screen arrangement, the "seams" may have a non-linear arrangement so that whenever the light from the LPD light engines 104 reach the "seams", only a portion of the "seam" is ever exposed to the light. Because the "seams" are non-linear, a "seam" is never visible to the naked eye. Alternatively, when each LPD light engine 104 has a separate, distinct screen, the "seam" will be more visible (as compared to the "quilted" screen), but the "seams" may be minimized by having pixel regions that extend all the way to the edge of the screen.

Figure 2:
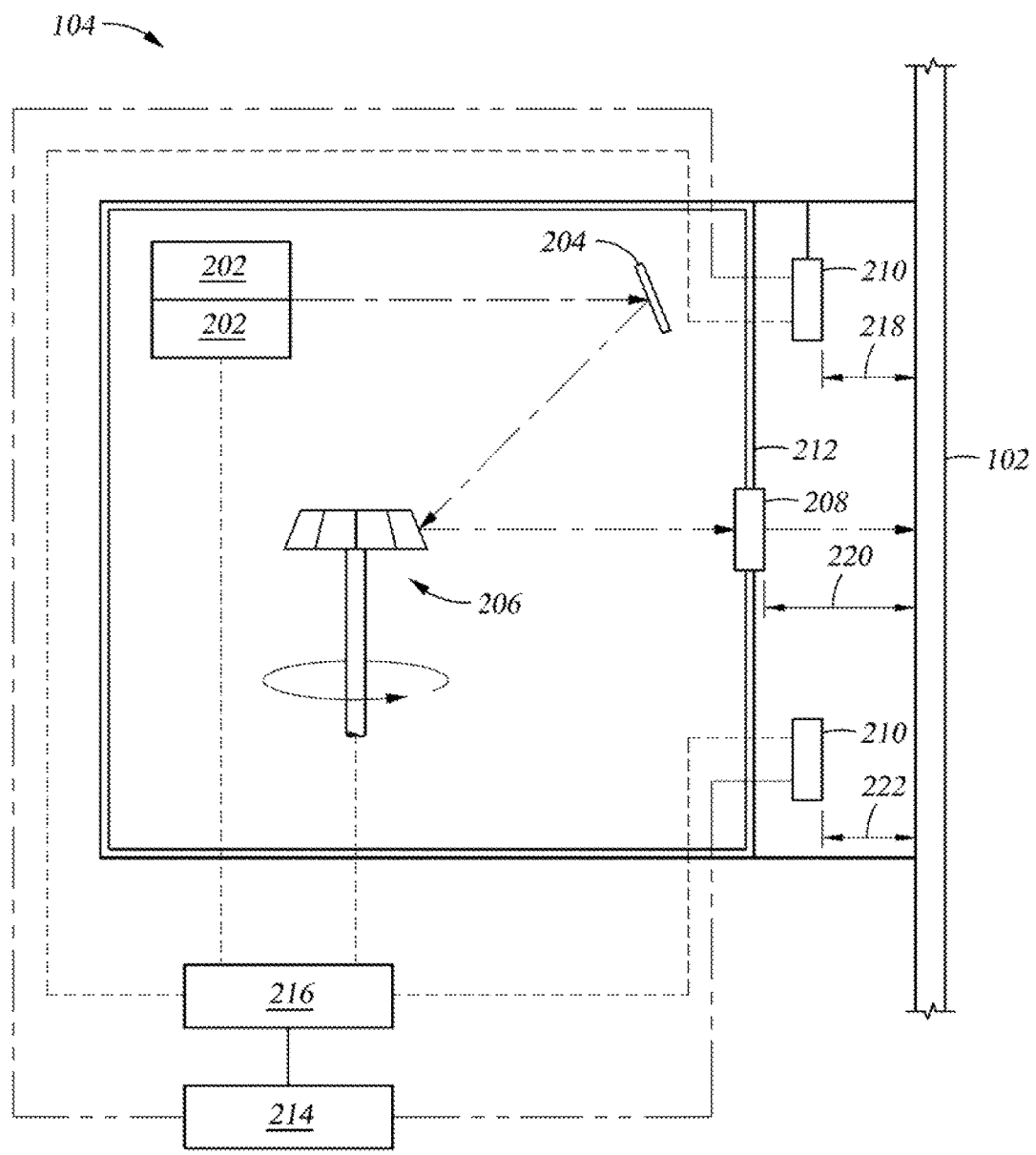
FIG. 2 is a schematic cross-sectional illustration of a single LPD according to one embodiment.

FIG. 2 is a schematic cross-sectional illustration of a single LPD light engine 104 according to one embodiment. The LPD light engine 104 includes the elements necessary to deliver the light from one or more light sources (which is a part of the LPS light engine 104) to the LPD screen 102. The LPD light engine 104 delivers two distinct types of light. The first type of light is infrared light that is used as a servo light. The second type of light delivered is the excitation light which is ultraviolet light that excites the phosphors and make an image. The elements that contribute to delivering the light from the light source will be discussed below. Each LPD light engine 104 includes one or more light sources 202. The light sources 202 may comprise a single light source or a plurality of light sources such as an array of light sources. Furthermore, the light source 202 may comprise one or more exciters. In one example the exciter is a laser. The exciters may be in a straight or curved and/or layered array. Light from the light source 202 is directed at a mirror 204 that reflects the light to a raster scanning device 206. In one embodiment the mirror 204 is tiltable. In one embodiment, the raster scanning device 206 may comprise a rotating raster polygon. The raster scanning device 206 may rotate about an axis that, in one embodiment, is angled relative to the LPD screen 102. The raster scanning device 206 determines where on the LPD screen 102 the light will impinge after passing through the lens 208. As the raster scanning device 206 rotates, the light will scan along the LPD screen 102 and illuminate different pixels.

Once the light impinges the LPD screen 102, some light will reflect and scatter as will be discussed below. As will be discussed below, the side of the LPD screen 102 that faces the LPD light engine 104 is a highly reflective surface with vertical reflective lambertian servo lines printed thereon. Detectors 210 detect scattered light from a servo light which is distinct from the excitation light. The detectors 210 are positioned between a wall 212 which separates the light source 202, mirror 204 and raster scanning device 206. The lens 208 is positioned within the wall 212 so that the light from the raster scanning device 206 only reaches the screen 102 through the lens 208. It is to be understood that the wall 212 may form a part of an enclosure for the LPD light engine 104. The wall 212, and in fact the entire enclosure where light is produced and travels through, may be coated in a light absorbing material (e.g., black paint) to minimize light reflecting from the wall 212.

The detectors 210 are coupled to a processor 214 which receives the detection information regarding the reflected/scattered light detected at the detectors 210. The processor 214 may include a timing control module that controls the timing of the on time and off time of the light source 202. The processor 214 then processes the information and sends information to the controller 216 that changes/adjusts the light source 202 timing and/or intensity and/or the raster scanning device 206 spinning rate. The detectors 210 are additionally coupled to the controller 216 which adjusts which detectors 210 are operational.

In operation, the detectors 210 and processor 214 function to accurately detect when the light from the LPD light engines 104 hit the Lambertian servo lines on the LPD screen 102 as well as the areas between the servo lines. The light is scanned across the LPD screen 102 during operation and, as will be described below, encounters the servo lines and hence scatters the light to be detected by the detectors. The light will also scan across the areas of the LPD screen 102 between the servo lines (i.e., reflective surface) where the light will reflect. The light that is scattered by the servo lines is collected by the detectors 210 while the reflected light is discarded. The processor 214 operates to accurately categorize and time the collection of the scattered light by the detectors 210 and additionally controls which detector 210 is in operation to collect the scattered light.

The wall 212 separates the raster device 206, light source 202 and mirror 204 from the screen 102. The wall 212 facing the screen 102 is black to prevent/reduce light reflectance from the wall 212 which may interfere with detector 210 operation. Additionally, any borders 218 between the screen 102 and the wall 212 will also be black to prevent/reduce light reflectance which may interfere with detector 210 operation. In FIG. 2, three borders 218 is shown. Borders 218 are used to provide an outer boundary between the LPD light engine 104 and the LPD screen 102. The borders 218 essentially provide an enclosure wherein lies the detectors 210 between the LPD screen 102 and the wall 212. The surfaces of the border 218 that face the detectors 210 may be coated with a light absorbing material. When an individual LPD light engine 104 has an individual LPD screen 102, then a border 218 will be present on all four sides between the screen LPD screen 102 and the wall 212. However, when multiple LPD light engines 104 are present with a common LPD screen 102, then an individual LPD light engine 104 may have less than all sides with a border 218 between the wall 212 and the LPD screen 102. For example, for the embodiment shown in FIG. 1B, there are multiple LPD light engines 104. The LPD light engines 104 that form the corner of the system 100 will have two sides with borders 218 while the LPD light engines 104 that form the sidewalls will have one side with a border 218. The LPDs 104 that form the center of the system will not have any borders 218. As noted above, the borders 218 will be coated with a light absorbing material on the side facing into the space between the wall 212 and the screen 102. Collectively, the borders 218, wall 212 and screen 102 form an enclosure. The light source 202, mirror 204 and raster scanning device 206 are disposed in a separate enclosure or sub-enclosure from the enclosure formed by the wall 212, borders 218 and screen 102. The borders 218 are, in essence, walls. Additionally in one embodiment, as shown in FIG. 2, the lens 208 is spaced farther from the screen 102 than the detectors 210 as shown by arrows 220 and 222. In one embodiment, all of the detectors 210 are spaced an equal distance from the screen 102. In another embodiment, the detectors 210 are spaced farther from the LPD screen 102 than the lens 208.

Figure 3A:
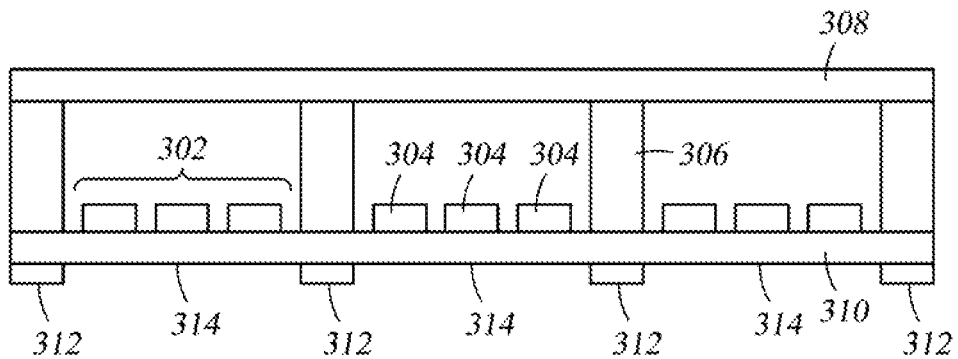
FIGS. 3A and 3B are schematic illustrations of a screen according to one embodiment.
Figure 3B:
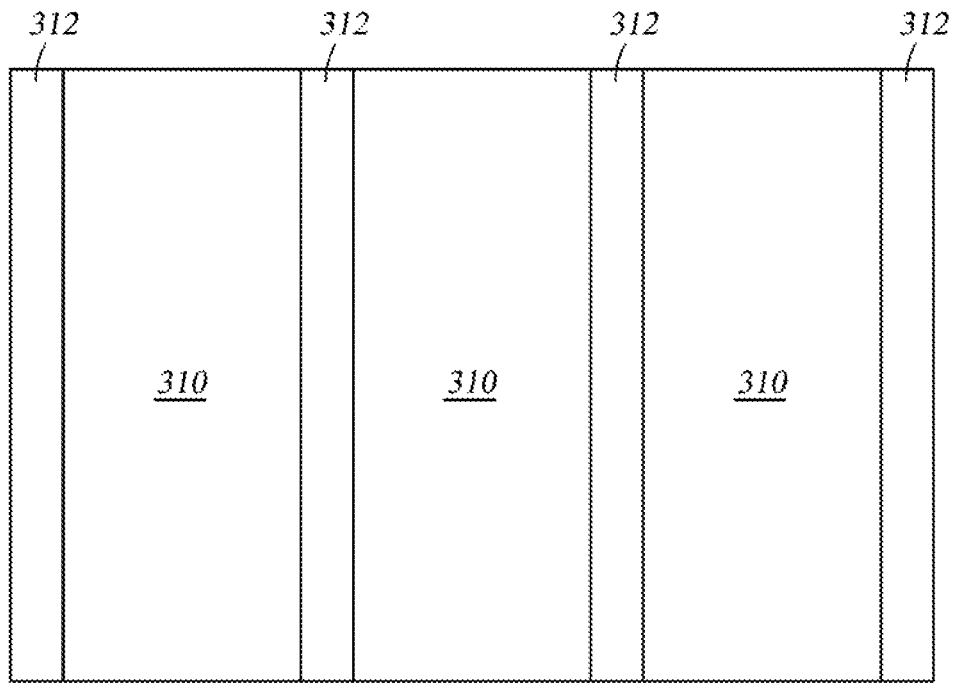

FIGS. 3A and 3B are schematic illustrations of a LPD screen 102 according to one embodiment. The LPD screen 102 includes a plurality of pixels 302 and subpixels 304. In one embodiment the subpixels 304 are arranged in stripes and are spaced apart by a distance such that a space is present between adjacent pixels 302 and adjacent subpixels 304. In one embodiment the space between subpixels is the same as the distance between pixels. The pixels 302 and subpixels 304 are spaced apart by a gap. In one embodiment In between adjacent pixels 302 and some subpixels 304 are support elements 306 that space the front panel 308 from the filter layer or back panel 310 of the screen 102. The pixels 302 are disposed on a first side of the back panel 310. In operation, light from the light source 202, after passing through the lens 208 by way of the mirror 204 and raster scanning device 206, passes through the back panel 310 and illuminates the pixels 302 and subpixels 304.

As discussed earlier, the light scattered from the Lambertian servo lines should be detected so that the light source 202 and/or raster scanning device 206 may be adjusted. The LPD screen 102 has a first side, which may be referred to as a viewer side where the viewer sees the displayed image. The LPD screen 102 also has a second side opposite the first side. In order to detect the light, reflective regions 312, such as white stripes, are placed on the second side, which is parallel to the first side) of the back panel 310 of the LPD screen 102. The reflective regions 312 diffusely reflect light while the regions therebetween specularly reflect the light. The detectors 210 discussed above detect the diffusely reflected light. Between adjacent reflective regions 312 is the exposed back surface 314 of the screen. The exposed back surface 314 is specularly reflective. When the light hits the reflective regions 312, the light is diffusely reflected or spread and detected by a detector 210. Upon detection, a feedback signal is sent to the processor 214 which then causes the controller 216 to perform a function. It is to be noted that the reflective regions 312 are strategically placed to not block any light from reaching pixels 302 or subpixels 340. Rather, the reflective regions 312 are placed to be aligned so as not to interfere with the excitation laser and target phosphor regions. In other words, the reflective regions 312 are strategically placed to align with a corresponding space between adjacent stripes of the plurality of subpixels.

The detectors 210 are so placed so that any light not originated by one or more specularly reflective designated marks, such as specular reflection from the mirror-like back panel 310 or cross talk from neighboring LPDs is avoided for detection purposes. In operation, the light originates from the light source 202, reflects off the mirror 204 and to the raster scanning device 206. The light then passes through the lens 208 and impinges on the LPD screen 102. As the raster scanning device 206 rotates, mirrors on the raster scanning device 206 rotate into various rotational positions. The mirrors arranged such that light reflects from the mirrors and passes through the lens 208 to a desired part of the LPD screen 102. As the raster scanning device 206 rotates, different mirrors reflect the light towards the lens 208 and thus the light reaches different areas of the LPD screen 102. The rotating of different mirrors into a position to reflect light provides for the excitation and servo beams to be positioned to permit the light, now in the form or a beam, to impinge the exposed back surface 314 of the LPD screen 102 (i.e., light will reach the subpixel regions) and reflective regions 312 respectively. The mirrors on the raster scanning device 206 determine where on the LPD screen 102 the light, in the form of a beam passing through the lens, will impinge. Hence, the light, due to the mirrors of the raster scanning device 206 is consecutively directed at different locations on the LPD screen. When the light impinges on the reflective regions 312, the light is diffusely reflected and scattered. Some of the reflected and scattered light is detected at the detectors 210.

If all of the detectors 210 are operational, then specular reflection may interfere with detector 210 accuracy. Specular reflection occurs when light impinges the exposed back surface. The diffuse reflection occurs when the light hits the reflective regions 312. If the detectors 210 are operational all the time, then the detectors may be detecting not only diffusely reflected light, but also specularly reflected light. Specularly reflected light is not desirable for detection purposes as the specular reflected light represents false information. Furthermore, even diffusely reflected light detected from a location between servo lines may not be an accurate depiction of the light delivered to the LPD screen 102. In particular, specular reflection, smudges on the screen, scratches on the screen, etc. may lead to increased noise in the detected signal. Therefore, placement and operation of the detectors can affect the accuracy of the detectors' detection.

Figure 4A:
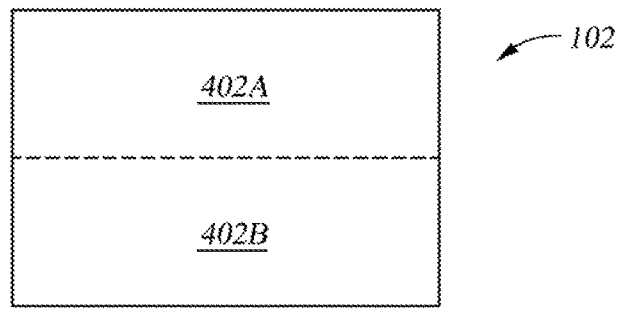
FIGS. 4A-4D are schematic illustrations showing a two detector system embodiment.
Figure 4B:
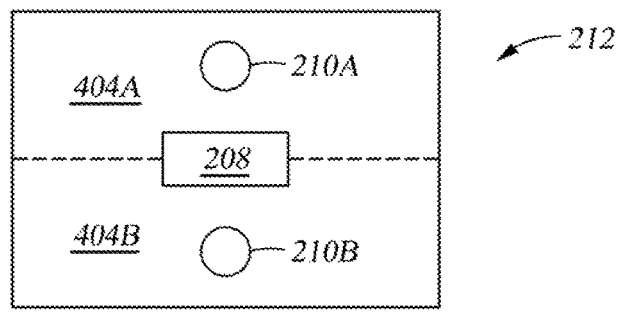
Figure 4C:
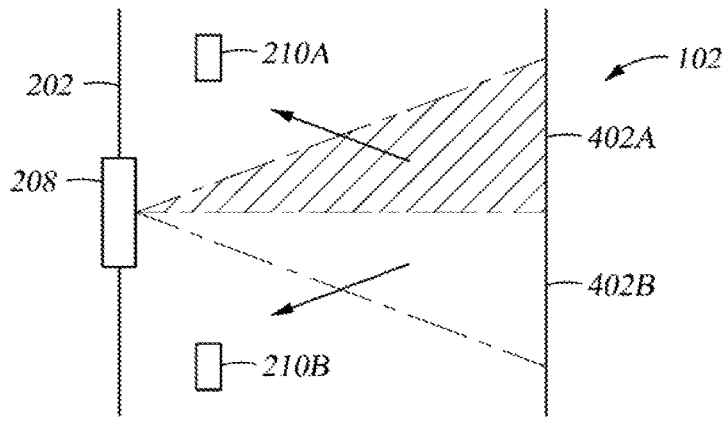

FIGS. 4A-4C are schematic illustrations showing a two detector system embodiment. As shown in FIG. 4A, the screen 102 is divided into two hypothetical halves 402A, 402B. As shown in FIG. 4B, the wall 212 has been divided into two hypothetical halves 404A, 404B with the lens 208 disposed in the middle of the hypothetical half, though spaced from the wall 212. One detector 210A is placed in the top half 404A and a second detector 210B is placed in the bottom half 404B.

Figure 4D:
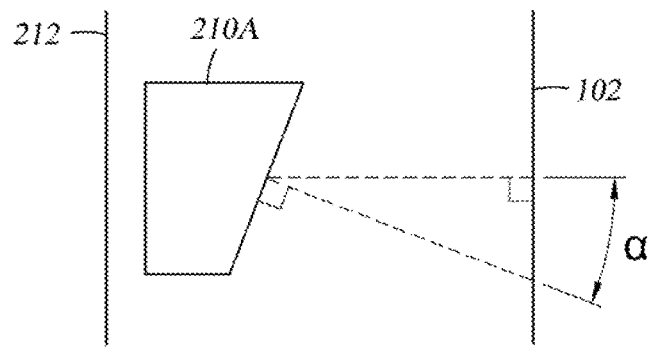

FIG. 4C illustrates the operation of the detectors 210A, 210B. During the time when light passes through the lens 208 and is to impinge the top half 402A of the screen 102, the top half detector 210A is turned off (i.e., does not operate) and the bottom half detector 210B is turned on (i.e., is operational). Thus, the system is less likely to have excess noise as a result of too many detectors being unnecessarily operational, thereby inadvertently capturing spurious signals that may have reached the detector 210A. Similarly, during the time when light is directed at the bottom half 402B of the screen 102, the bottom half detector 210B is turned off while the top half detector 210A is turned on. Thus, the detectors 210A, 210B do not detect the light reflected/scattered from the half of the LPD screen 102 that is directly in front of the respective detectors 210A, 210B. In such a manner, the detectors 210A, 210B may be angled relative to the screen 102 such that the detectors 210A, 210B have a face that is angled (i.e., not parallel) to the second side of the screen 102 as shown by angle α in FIG. 4D. In one embodiment, the angle α may be about 22 degrees from horizontal. In another embodiment, the angle α may be between about 11 degrees and about 33 degrees from horizontal. The angle α may be a function of the size of the screen, distance of the detector from the screen and/or the height width position of the detector from the screen.

Figure 5A:
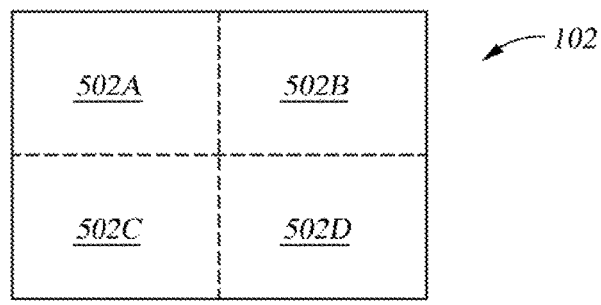
FIGS. 5A-5D are schematic illustrations of a four detector embodiment.
Figure 5B:
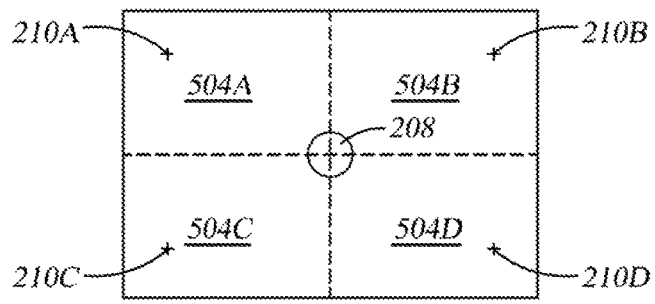
Figure 5C:
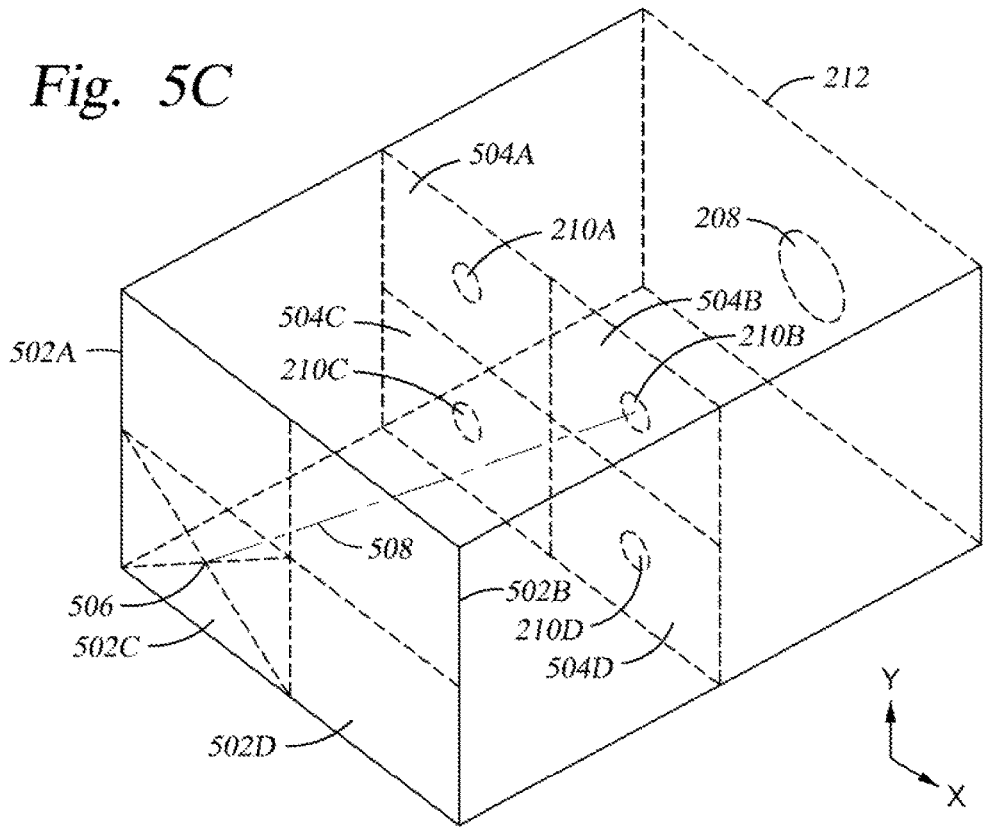

Although FIGS. 4A-4D illustrate a two detector embodiment, it is to be understood that additional detectors may be present. FIGS. 5A-5D are schematic illustrations of a four detector embodiment. As shown in FIG. 5A, the screen 102 is divided into four hypothetical sections 502A-502D. FIG. 5B shows the detectors placed into four hypothetical sections 504A-504D of equal area with each section 504A-504D having a detector 210A-210D. FIG. 5C is an isometric illustration showing the lens 208 through the wall 212 with the detectors 210A-210D disposed between the wall 212 and the screen 102. It is to be understood that it is contemplated that the detectors 210A-210D may be disposed on the wall 212 in one embodiment. It is to be understood that it is contemplated that the detectors 210A-210D may not be in a plane in one embodiment.

Figure 5D:
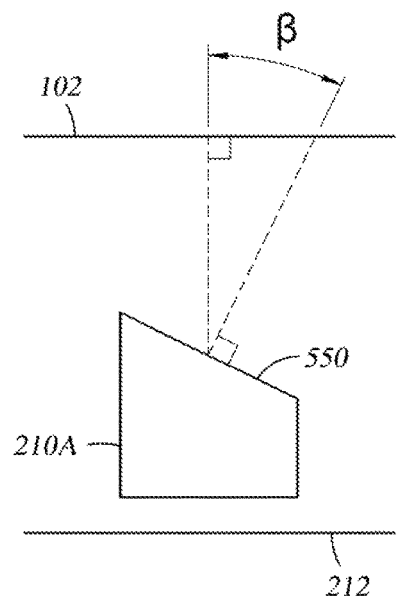

In FIG. 5C, the detectors 210A-210D are arranged to detect light from the section 502A-502D of the screen 102 that are catty corner to the section 502A-502D directly across from the detector 210A-210D. As an example, detector 210B disposed in section 504B is positioned and angled to detect light from section 502C by being positioned such that the sensor face faces towards the center 506 of the section 502C. In another example, detector 210B disposed in section 504B is positioned and angled to detect light from section 502C by being positioned such that the sensor face faces towards approximately the center 506 of the section 502C. The dashed-dot line 508 represents the center line of the detector face of the detector 210B intersecting with the center 506 of the section 502C. Thus, as shown in FIG. 5D, not only are the detectors 210 angled relative to the second side of the screen 102 when viewed from the side and shown in FIG. 4D, but the detectors 210 are also angled relative to the second side of the screen by an angle β when viewed from the top as shown in FIG. 5D. In one embodiment, the angle β may be about 37 degrees from vertical. In another embodiment, the angle β may be between about 24 degrees and about 46 degrees from vertical. Stated another way, the detector 210A has a face 550 that has a centerline that is perpendicular to the face 550. The center line of the face 550 is not perpendicular to the screen 102.

Therefore, when the system is in a state in which light is directed at section 502A, detector 210D is enabled on while detectors 210A, 210B, 210C are turned off. Similarly, when the system is in a state in which light is directed at section 502B, detector 210C is enabled on while detectors 210A, 210B, 210D are turned off. When light is directed at section 502C, detector 210B is on while detectors 210A, 210C, 210D are turned off. Finally, when light is directed at section 502D, detector 210A is on while detectors 210B, 210C, 210D are turned off. Thus, the detectors that are off are unable to detect any light scattered or reflected from the section directly in line with the section within which the detector is disposed.

Figure 6:
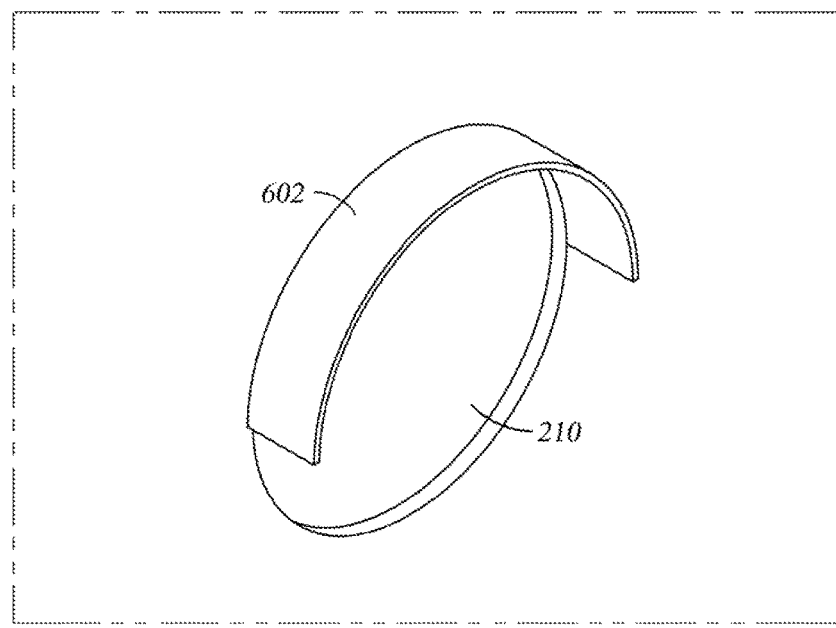
FIG. 6 is an isometric illustration of a detector having a blinder thereon.

In general, the detectors 210 should be placed sufficiently far from the LPD screen 102 and from the optical axis. The optical axis is imaginary straight line that goes through the lens 208 center and the panel center. The distance from the LPD screen 102 is a trade-off between the signal strength and signal uniformity. The signal amplitude is detected from a set of Lambertian lines varies with the distance and orientation of the detector. The signal uniformity refers to the condition where the variation from this set is smallest (i.e., minimum standard deviation). The distance from the origin (i.e., panel center) is a trade-off between the signal strength, signal uniformity and specular immunity. Specular immunity refers to insensitivity to specular reflections which the detector needs to avoid. Once the position for the detectors has been determined, the detector orientation is taken such that the normal is pointing toward the center of the rectangular area that the detector serves. As shown in FIG. 6, restricting structures 602, such as baffles/blinders, may be used to increase the detection immunity to unintended stray light, by preventing stray extraneous light from being detected by the detector 210.

As noted above, the detectors 210 are angled relative to the screen 102. In the four detector 210 situation, the screen 102 is hypothetically divided into four quadrants of substantially equal area. Each quadrant has a corresponding detector 210. The detectors 210 are angled relative to the screen 102 such that the detectors each have a horizontal angle and a vertical angle as noted above. Consider that in the quadrant situation, two of the quadrants are "upper" quadrants and two of the quadrants are "lower" quadrants. Similarly, of the four quadrants, two of the quadrants are "left" quadrants and two of the quadrants are "right" quadrants. Thus, each quadrant can be identified in the following manner, upper left quadrant, upper right quadrant, lower left quadrant, and lower right quadrant. The horizontal angle is chosen so that the detector is angled to not be directed at the center point of the quadrant directly in front of the detector. Rather, the horizontal angle is chosen so that a given detector in one of the "left" quadrants is pointed towards the "right" quadrants, and vice versa. Similarly, the vertical angle is chosen so that the detector is angled to not be directed at the center point of the quadrant directly in front of the detector. Rather, the vertical angle is chosen so that a given detector in one of the "upper" quadrants is pointed towards the "lower" quadrants and vice versa. Thus, each detector in the quadrant system is angled as follows, the upper left quadrant is directed to detect light from the lower right quadrant; the upper right quadrant is directed to detect light from the lower left quadrant; the lower left quadrant is directed to detect light from the upper right quadrant; and the lower right quadrant is directed to detect light from the upper left quadrant. The vertical angle may be between about 11 degrees to about 33 degrees, and the horizontal angle may be between about 24 degrees and about 46 degrees.

Figure 8B:
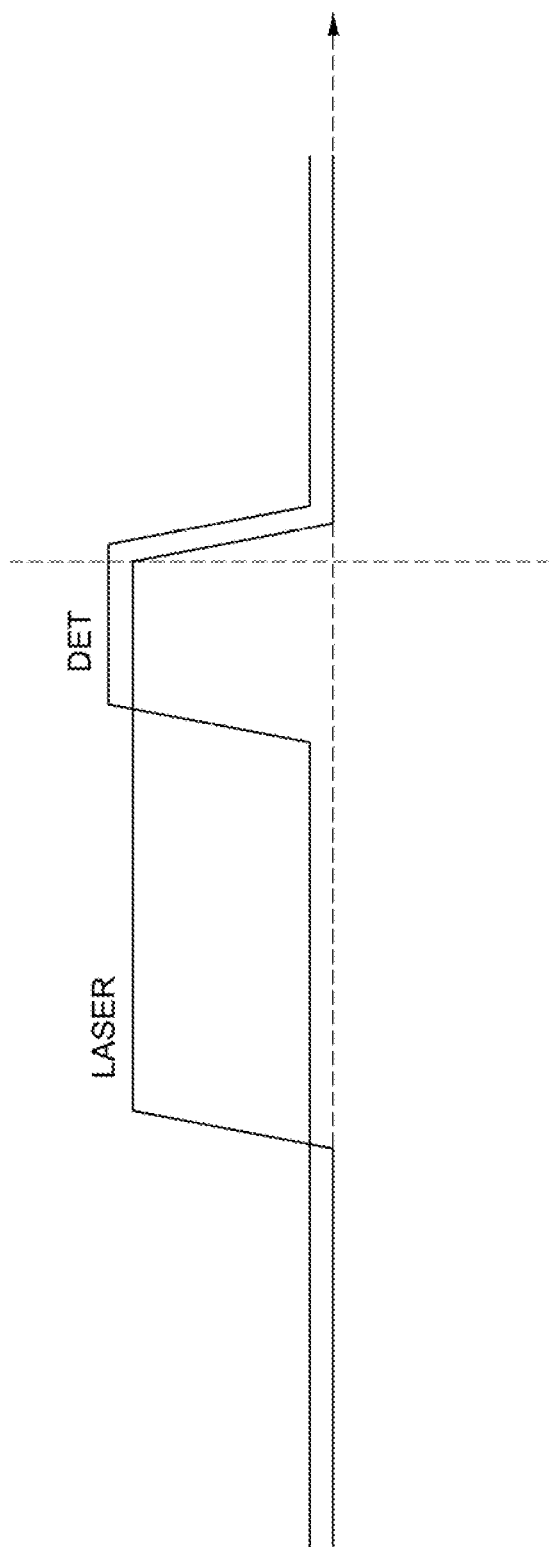

Now consider the operation of the system in conjunction with FIGS. 8A and 8B. FIG. 8A illustrates four separate quadrants (i.e., Quadrants A-D) that each have a corresponding detector (i.e., detector A-D) that is disposed directly there across. Within each quadrant are reflective regions or stripes. It is to be understood that the number of reflective regions per quadrant is not to be limited to the number shown in FIG. 8A. Rather, FIG. 8 is simply for illustration purposes only. In a broad sense, when the laser is "on" for Quadrant A, detector D is also on while detectors A-C are not operational. When the laser is "on" for Quadrant B, detector C is operational while detectors A, B and D are not. When the laser is "on" for Quadrant C, detector B is operational while detectors A, C and D are not. When the laser is "on" for Quadrant D, detector A is operational while detectors B-D are not.

Now turning to the operation of the detector with the laser shown in FIG. 8B, it can be seen that the detector is not "on" or operational for as long as the laser. Rather, the laser is "on" for a period of time before the detector is operational. Then, both the laser and the detector are not operational at substantially the same time. When the reflective regions or stripe or line is detected, the instant of detection is recorded and immediately the detector and the laser are both turned off, however, if the line or strip or reflective region is not detected, then both the laser and the detector are turned off after a set period of time.

Figure 7:
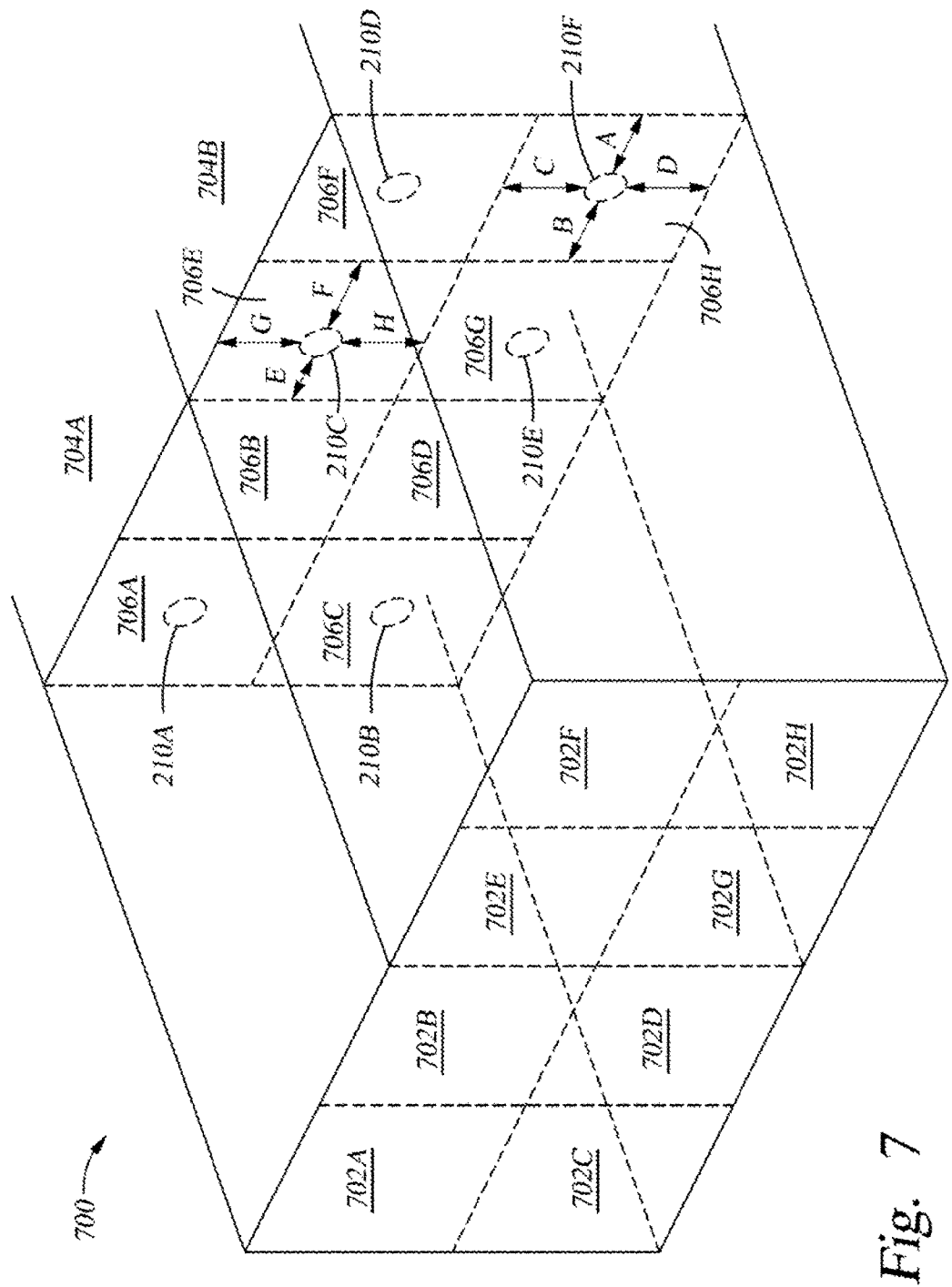
FIG. 7 is a schematic illustration of a two LPD system sharing detectors.

It is contemplated that detectors 210 in one LPD light engine 104 may be used to detect light from an adjacent LPD light engine 104. FIG. 7 is a schematic illustration of a two LPD light engine system 700 sharing detectors 210. As shown in FIG. 7, LPD screen 102 has been divided into eight hypothetical sections 702A-702H. Similarly, walls 212 of the respective LPD light engines 704A, 704B have been divided into eight hypothetical sections 706A-706H. Rather than eight detectors 210, less than eight, for example six detectors 210A-210F are present. The reason to use six detectors 210 rather than eight detectors 210 is to reduce costs in manufacturing. It is contemplated that a detector 210 may be positioned to detect diffusely scattered light from multiple LPD screen 102 locations, not simply the locations corresponding to the LPD light engine 104 of the detector 210.

In the embodiment shown in FIG. 7, detector 210A is on when light is directed at section 702D, but not when light is directed to sections 702A, 702B or 702C. Detector 210B is on when light is directed at section 702C, but not when light is directed at sections 702A, 702B or 702D. Sections 706B and 706D do not have detectors therein because detectors 210E and 210C are sufficient to detect the diffusely reflected light that would otherwise be detected by detectors positioned in sections 706B and 706D. Rather, detector 210C is disposed in section 706E and detects light from section 702H and 702C. Similarly, detector 210E is disposed in section 706G and detects light from section 702F and 702A. Thus, detectors 210C and 210E are used to detect light from two different LPDs 704A, 704B.

In order for detectors 210C, 210E to be able to detect light from two different LPDs 704A, 704B, the detectors 210C, 210E may be spaced differently within the section as compared to other detectors. For example, detectors 210D, 210F, 210A and 210B may be substantially centered within the respective sections as shown by arrows "A", "B", "C" and "D". Detectors 210C and 210E, however, may be positioned to be able to detect the light from two different LPDs 704A, 704B. The detectors are angled to be able receive the diffusely reflected light from the hypothetical quadrants that correspond to an adjacent LPD light engine. The reason to have detectors detect diffusely reflected light from adjacent LPD light engines is to save on manufacturing costs. Thus, detector 210C, for example, may be spaced closer to borders 218 as shown by arrows "E" and "F" yet centered vertically within the section 706E as shown by arrows "G" and "H".

It is to be understood that the detectors 210 need not be centered within a hypothetical section. Rather, the detectors 210 may be strategically placed within the LPDs 704A, 704B so that the detectors accurately detect light from a hypothetical section of the screen 102 that is cattycorner to a hypothetical section directly across from the hypothetical section of the wall 212.

It is to be understood that while two detector, four detector and six detector embodiments have been shown, additional combinations of detectors are envisioned. In one embodiment, an even number of detectors are present.

By utilizing diffusively reflective regions on the back-panel of a screen, and strategically placing detectors, reflected light may be detected and information on the light feedback to a controller to adjust the display system and produce a desired image.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
 a screen, the screen including:
  a plurality of pixels, each pixel having a plurality of subpixels, wherein the subpixels are spaced apart by a distance such that a space is present between adjacent subpixels;
  a filter layer, wherein the pixels and subpixels are disposed on a first side of the filter layer, and wherein the filter layer has a second side opposite the first side and wherein the second side is parallel to the first side; and a plurality of first reflective regions, wherein the plurality of first reflective regions are disposed on the second side of the filter layer opposite the first side and wherein each first reflective region is aligned with a corresponding space between at least one pair of adjacent subpixels;

one or more light sources;

one or more raster scan devices;

one or more focusing lenses, wherein the one or more light sources, the one or more raster scanning devices and the one or more focusing lenses are arranged such that light emitted from the one or more light sources is directed at the one or more raster scanning devices and then directed through the one of more focusing lenses and then onto the screen; and a plurality of detectors, wherein each of the plurality of detectors is placed within a space between the second side of the filter layer and the one or more focusing lenses, wherein each detector has a face and wherein the face of each detector is angled towards a portion of the screen, wherein each detector's face is angled to a direction that is away from the detector's nearest point of the screen.

2. The system of claim 1, wherein the screen is hypothetically divided into multiple sections of equal area that each have a center point, and wherein the detector's face is angled to a center point on a section of the screen that is not the closest section to the detector spaced.

3. The system of claim 1, wherein the first reflective region is a lambertian reflective region and where light reflected from the lambertian reflective region is detected by the detector.

4. The system of claim 1, further comprising a second reflective region, wherein adjacent first reflective regions are spaced apart by the second reflective region that is different from the first reflective regions and wherein the second reflective region is specularly reflective.

5. A system, comprising:

a screen, the screen including:

a plurality of pixels, each pixel having a plurality of subpixels, wherein the subpixels are spaced apart by a distance such that a space is present between adjacent subpixels;

a filter layer, wherein the pixels and subpixels are disposed on a first side of the filter layer, and wherein the filter layer has a second side opposite the first side and wherein the second side is parallel to the first side; and a plurality of first reflective regions, wherein the plurality of first reflective regions are disposed on the second side of the filter layer opposite the first side and wherein each first reflective region is aligned with a corresponding space between at least one pair of adjacent subpixels;

one or more light sources;

one or more raster scan devices;

one or more focusing lenses, wherein the one or more light sources, the one or more raster scanning devices and the one or more focusing lenses are arranged such that light emitted from the one or more light sources is directed at the one or more raster scanning devices and then directed through the one of more focusing lenses and then onto the screen; and a plurality of detectors, wherein each of the plurality of detectors is placed within a space between the second side of the filter layer and the one or more focusing lenses, wherein each detector has a face and wherein the face of each detector is angled towards a portion of the screen, wherein each detector's face is angled to a direction that is away from the detector's nearest point of the screen, the system further comprising a timing control module, wherein the timing control module controls the timing of the on time/off time of the one or more light sources;

wherein at least one of the one or more light sources will reflect off the first and second reflective regions;

wherein the detector's face is angled to a screen position that is substantially a first local raster scan region center point of a light illuminated pixel position region;

wherein the detector is turned on when the light is illuminating the local raster scan region; and wherein the detector is turned off when the light is illuminating a second local raster scan region.

6. The system of claim 5, wherein the detector detects light reflected from a lambertian reflector in the vicinity of the first local raster scan region.

7. The system of claim 1, wherein the plurality of detectors comprises an even number of detectors.

8. The system of claim 1, further comprising one or more baffles coupled to each detector.

9. The system of claim 1, the one or more light sources comprises a plurality of light sources, wherein at least one light source is an excitation light source and at least one light source is a servo light source.

10. A system, comprising:

a screen, the screen including:

a plurality of pixels, each pixel having a plurality of subpixels, wherein the subpixels are spaced apart by a distance such that a space is present between adjacent subpixels;

a filter layer, wherein the pixels and subpixels are disposed on a first side of the filter layer, and wherein the filter layer has a second side opposite the first side and wherein the second side is parallel to the first side; and a plurality of first reflective regions, wherein the plurality of first reflective regions are disposed on the second side of the filter layer opposite the first side and wherein each first reflective region is aligned with a corresponding space between at least one pair of adjacent subpixels;

one or more light sources;

one or more raster scan devices;

one or more focusing lenses, wherein the one or more light sources, the one or more raster scanning devices and the one or more focusing lenses are arranged such that light emitted from the one or more light sources is directed at the one or more raster scanning devices and then directed through the one of more focusing lenses and then onto the screen; and a plurality of detectors, wherein each of the plurality of detectors is placed within a space between the second side of the filter layer and the one or more focusing lenses, wherein each detector has a face and wherein the face of each detector is angled towards a portion of the screen, wherein each detector's face is angled to a direction that is away from the detector's nearest point of the screen, wherein at least one detector is angled between about 11 degrees and about 33 degrees from vertical.

11. The system of claim 10, wherein the at least one detector is additionally angled between about 24 degrees and about 46 degrees from horizontal.

12. The system of claim 1, wherein the plurality of detectors are disposed closer to the screen than the one or more focusing lens.

13. A system, comprising:
an enclosure, wherein the enclosure is bound by a screen and a plurality of walls, the screen including a filter layer having a plurality of reflective regions disposed thereon, the enclosure having detection area and a plurality of sub-enclosures, each sub-enclosure having an enclosure wall having an opening therethrough;
one or more light sources disposed within each sub-enclosure;
a raster scan device disposed within each sub-enclosure;
a focusing lens disposed within the opening of each sub-enclosure; and
a plurality of detectors disposed between the enclosure wall of a corresponding sub-enclosure and the screen, wherein the plurality of detectors are facing the screen, wherein each detector is positioned to detect scattered light from the screen that originates from one or more light sources disposed within a corresponding sub-enclosure and wherein a center line of each detector intersects a center of a hypothetical quadrant of the screen that is cattycorner the hypothetical quadrant of where the detector is located.

14. The system of claim 13, wherein the detection area has walls that are black.

15. The system of claim 13, wherein the plurality of detectors comprises an even number of detectors.

16. The system of claim 13, further comprising one or more baffles coupled to each detector.

17. A system, comprising:
an enclosure, wherein the enclosure is bound by a screen and a plurality of walls, the screen including a filter layer having a plurality of reflective regions disposed thereon, the enclosure having detection area and a plurality of sub-enclosures, each sub-enclosure having an enclosure wall having an opening therethrough;
one or more light sources disposed within each sub-enclosure;
a raster scan device disposed within each sub-enclosure;
a focusing lens disposed within the opening of each sub-enclosure; and
a plurality of detectors disposed between the enclosure wall of a corresponding sub-enclosure and the screen, wherein the plurality of detectors are facing the screen, wherein each detector is positioned to detect scattered light from the screen that originates from one or more light sources disposed within a corresponding sub-enclosure and, wherein at least one detector is angled between about 11 degrees and about 33 degrees from vertical.

18. The system of claim 17, wherein the at least one detector is additionally angled between about 24 degrees and about 46 degrees from horizontal.

19. The system of claim 14, wherein less than all sub-enclosures have walls extending into the detection area.

20. A system, comprising:
a screen, the screen having a filter layer with a plurality of reflective regions thereon;
a light source;
a light directing system disposed between the light source and the screen and configured to direct light at the filter layer and scan the light across the filter layer; and
four detectors disposed in a plane that has four hypothetical quadrants, wherein the screen has four hypothetical quadrants that are aligned with the four hypothetical quadrants of the plane, wherein the plane is parallel to the screen, wherein each detector has a face that is disposed at an angle relative to the screen, wherein a center line of each detector is perpendicular to the face of the corresponding detector, wherein the center line of each detector intersects a center of a hypothetical quadrant of the screen that is cattycorner the hypothetical quadrant of where the detector is located.

21. A method, comprising:
directing a light from a light source to a screen, wherein the screen is divided into four hypothetical quadrants including an upper left quadrant, an upper right quadrant, a lower left quadrant, and a lower right quadrant, and wherein the screen additionally has reflective regions and pixel regions disposed between the reflective regions;
scanning the light across the screen; and
detecting the light that has been diffusely reflected from the screen, wherein the detecting is performed by a plurality of detectors, wherein each hypothetical quadrant has a corresponding detector including an upper left detector, an upper right detector, a lower left detector, and a lower right detector, and wherein the detecting comprises:
detecting light reflected from the upper left quadrant with the lower right detector;
detecting light reflected from the upper right quadrant with the lower left detector;
detecting light reflected from the lower left quadrant with the upper right detector; and
detecting light reflected from the lower right quadrant with the upper left detector.

22. The method of claim 21, wherein during detecting light reflected from the upper left quadrant, the lower left detector, the upper right detector and the upper left detector are not operational.

23. The method of claim 22, wherein during detecting light reflected from the upper right quadrant, the lower right detector, the upper right detector and the upper left detector are not operational.

24. The method of claim 23, wherein during detecting light reflected from the lower left quadrant, the lower left detector, the lower right detector and the upper left detector are not operational.

25. The method of claim 24, wherein during detecting light reflected from the lower right quadrant, the lower left detector, the lower right detector and the upper right detector are not operational.

* * * * *